United States Patent [19]
Rehorn

[11] Patent Number: 5,586,503
[45] Date of Patent: Dec. 24, 1996

[54] PASSENGER RESTRAINT SYSTEM

[76] Inventor: Don W. Rehorn, 140 Calle San Simon, Sante Fe, N.M. 87505

[21] Appl. No.: 472,324

[22] Filed: Jun. 7, 1995

[51] Int. Cl.⁶ .................................................. B61B 11/00
[52] U.S. Cl. ........................ 104/241; 105/149.2; 280/804; 297/469; 297/478
[58] Field of Search ................................ 104/241, 173.1, 104/180; 105/149.2; 280/803, 804; 297/469, 473, 475, 487

[56] References Cited

U.S. PATENT DOCUMENTS

| | | | |
|---|---|---|---|
| 2,244,650 | 6/1941 | Curran et al. | 104/149.2 |
| 2,592,879 | 4/1952 | Eyerly | 104/241 |
| 2,816,597 | 12/1957 | Lodvick et al. | 297/487 |
| 3,494,633 | 2/1970 | Malloy | 280/749 |
| 3,556,014 | 1/1971 | Rudkin, Jr. | 105/149.2 |
| 3,899,042 | 8/1975 | Bonar | 280/753 |
| 4,360,225 | 11/1982 | Thomas et al. | 280/804 |
| 4,509,798 | 4/1985 | Strothers | 297/487 |
| 4,784,065 | 11/1988 | Brochand | 105/149.2 |
| 4,896,742 | 1/1990 | Shitanoki et al. | 280/804 |
| 5,125,718 | 6/1992 | Czernakowski et al. | 297/484 |
| 5,286,091 | 2/1994 | Busch | 297/487 |

Primary Examiner—S. Joseph Morano
Attorney, Agent, or Firm—Herbert J. Hammond

[57] ABSTRACT

A passive passenger restraint system adapted for use with aerial, cable-supported chairlifts includes a passive restraint that is driven by the motion of the chairlift. A seatbelt automatically deploys across the laps of the passengers. The seatbelt restrains the passengers until the end of the trip and then releases the restraint just before unloading the passengers. After unloading, the restraint system automatically resets for the next passengers and the next deployment cycle. A similar passenger restraint system for use in vehicles restrains passengers individually using a shoulder belt and a lap belt.

21 Claims, 7 Drawing Sheets

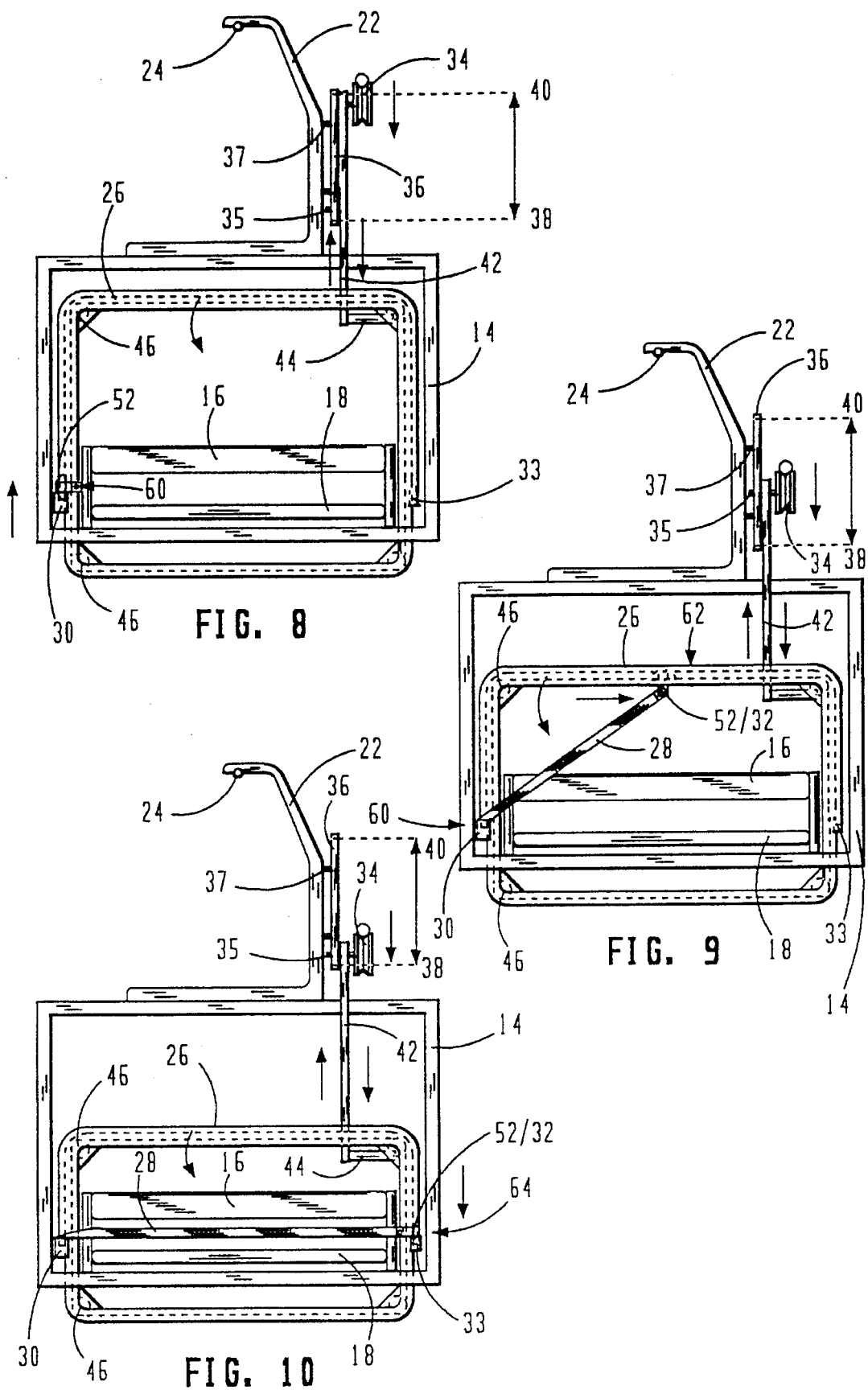

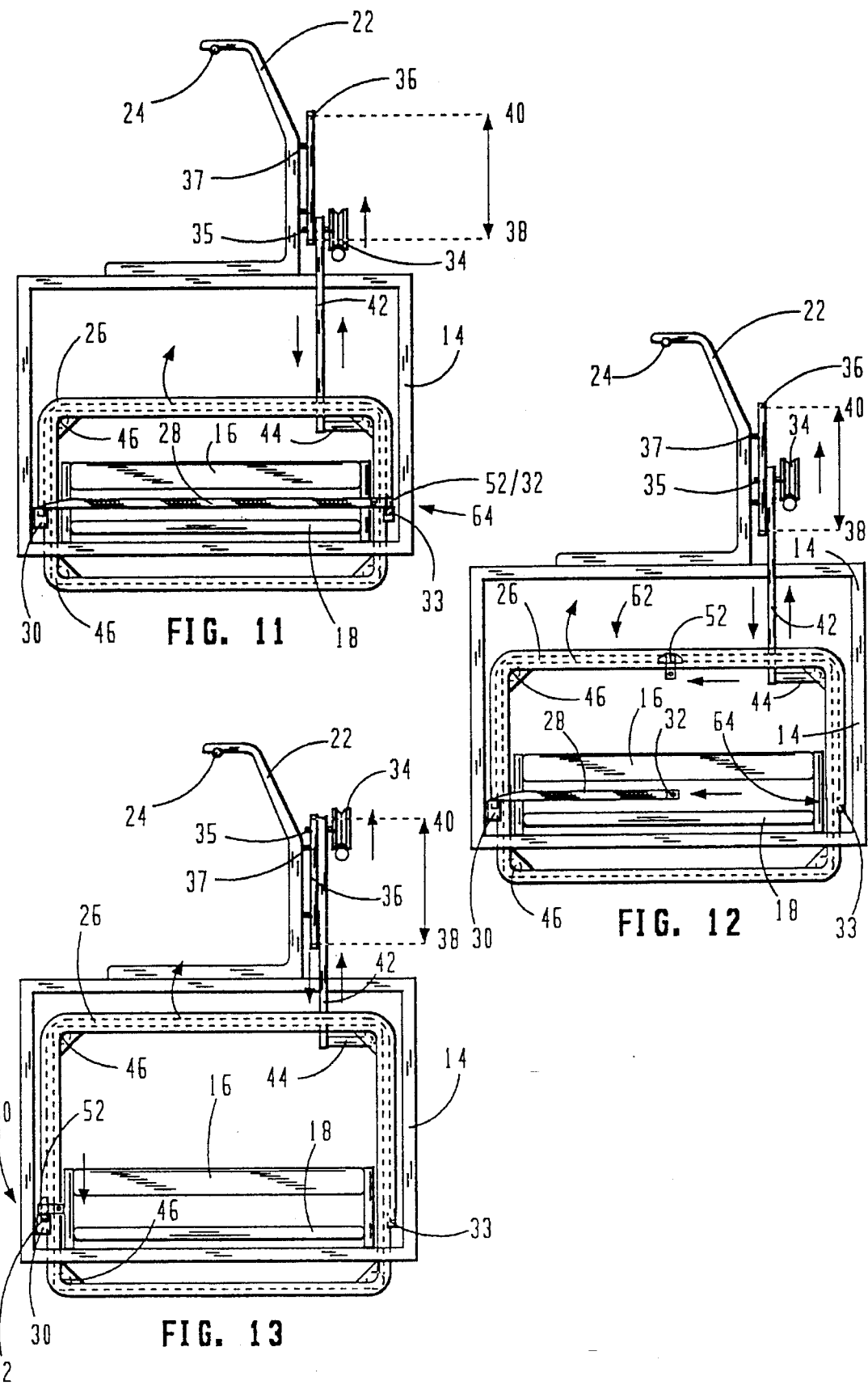

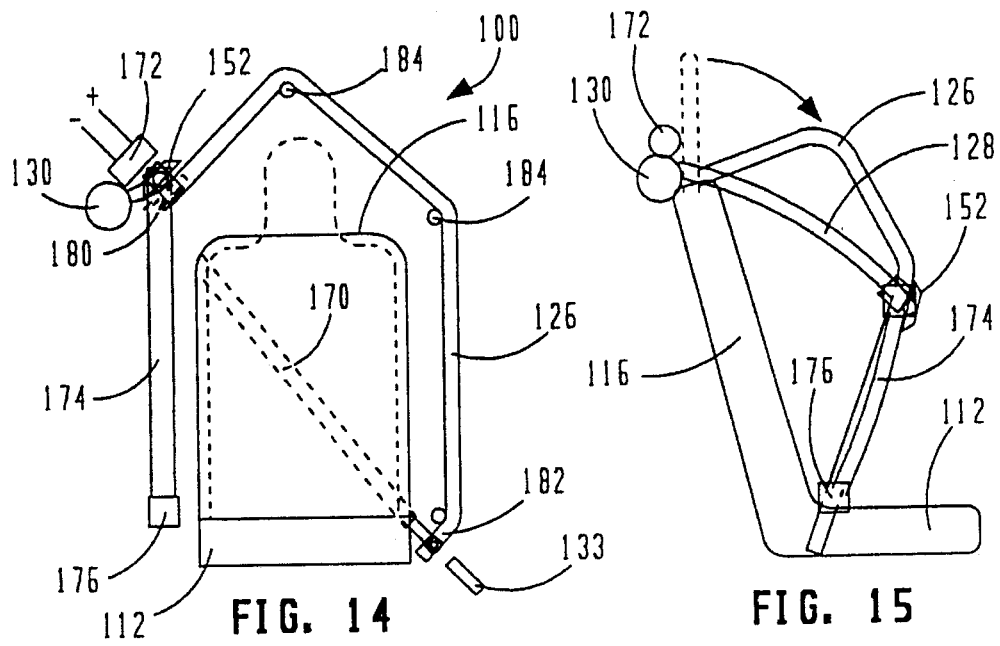
FIG. 14
FIG. 15
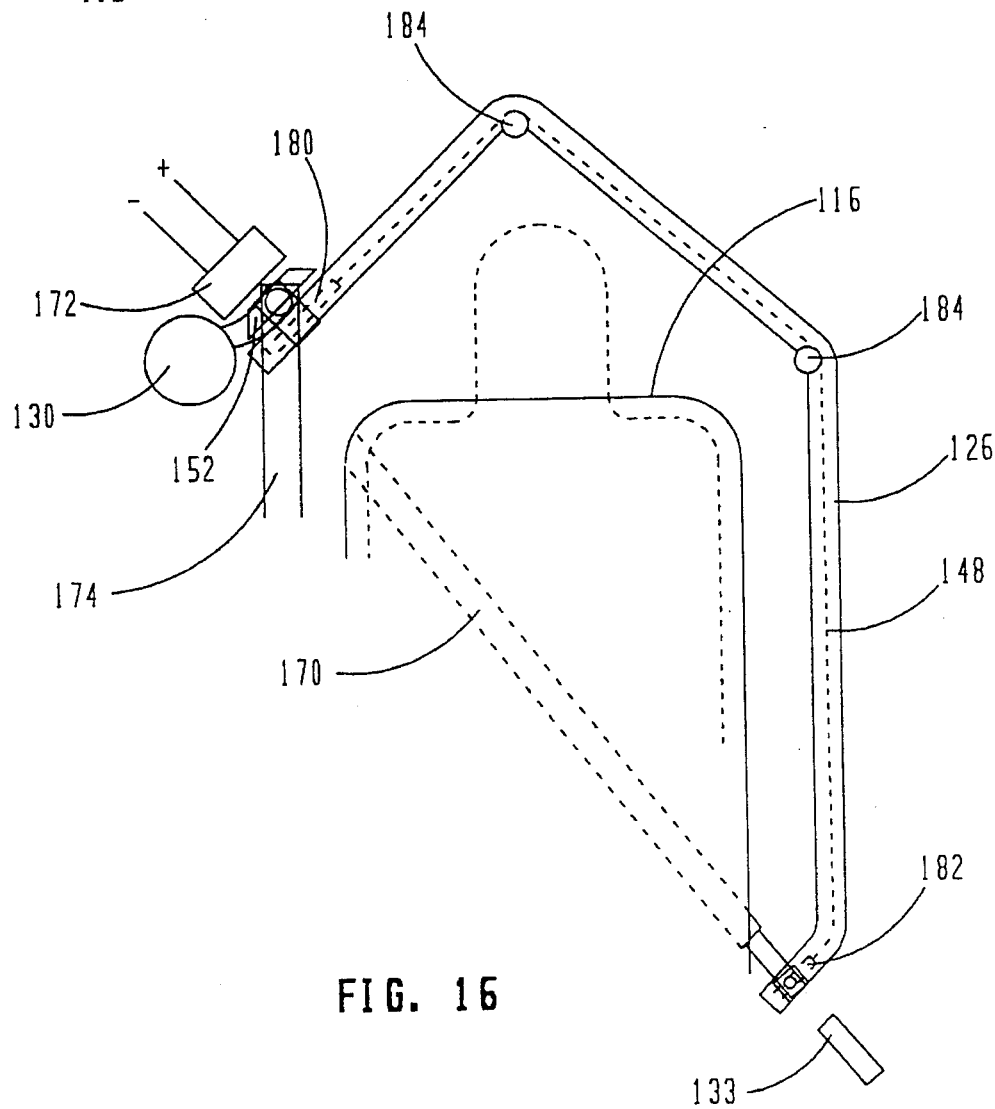
FIG. 16

PASSENGER RESTRAINT SYSTEM

TECHNICAL FIELD OF THE INVENTION

This invention relates generally to passenger restraint systems and more particularly to a passenger restraint system for cable-operated, aerial chairlifts used in the skiing and amusement industries and to a passenger restraint system for vehicles.

BACKGROUND OF THE INVENTION

There are two main types of passenger restraint systems: active and passive systems. The most prevalent active restraint is a flexible seat belt which is manually positioned to encircle the passenger's waist. This type of restraint is sometimes employed in connection with aerial chairlifts at ski resorts and amusement parks, as well as in vehicles.

Safety bar restraints are another type of active restraint system. With this restraint system, bars are pivotally mounted to be positionable in front of the occupants during use. Safety bar restraints are fairly common in the skiing and amusement park industries. For example, U.S. Pat. No. 2,244,650 to Curran, et al. discloses a chair for an aerial tramway having a movable safety bar to restrain the riders.

Passive restraint systems are also available, most commonly in automobiles. These restraint systems engage automatically in response to a predetermined event, e.g., putting the key in the ignition, closing the car door, etc. For example, U.S. Pat. No. 3,899,042 to Bonar discloses an automobile seat automatic passenger-securing safety bar that is activated when a passenger sits down on, and leans back against, a seat.

Although prior art restraint systems have been widely used in resorts and amusement parks, they are not entirely satisfactory. For example, with belt-type active restraint systems, the ski resort or amusement park personnel must spend additional time to ensure that the belts are engaged prior to movement of the chair. This delay impedes timely progression of the chairs along the track. Active restraint systems can be labor intensive at the end of the trip as well. Resort or park personnel may need to assist passengers with disengagement of the belts or safety bars prior to exit. In addition, the employees must reposition or otherwise prepare the restraints for the next passengers.

Since active restraint systems are commonly designed so that the passenger engages the restraint, there may be human error in failing to engage the restraint at all or failing to engage it properly. If the restraint has no automatic locking mechanism, a passenger may be able to disengage the seatbelt or safety bar while the chair is in mid-air.

Safety bar type restraints may require complicated maneuvers by the passengers in moving the same to their operative position prior to movement of the chair. If a passenger does not engage the safety bar prior to the beginning of the ascent, or does not lock the safety bar in a restrained position, he may be injured. Like the belt-type restraints, safety bars may be disengaged during the trip. Neither the seatbelt nor safety bar (active) restraint system includes an automatic deployment or retraction feature.

Passive restraint systems are also not entirely successful. They are not designed to restrain multiple passengers. They are typically not used in open-air vehicles. Passive systems in chair lifts do not use lapbelts to restrain the passengers. Instead, they use shoulder belts or safety bars.

Some ski resorts do not use any restraint system in connection with their chairlifts. At these resorts, skiers sit in chairs and are transported up the mountain via the lift. With completely unrestrained chairs, skiers face potential injury from falls during the ascent.

Thus, there is a need for a passenger restraint system that does not include the above-described disadvantages.

SUMMARY OF THE INVENTION

The present invention comprises a passenger restraint system that overcomes the disadvantages associated with the prior art. A passenger restraint system for restraining passengers in an elevated., open-air vehicle comprises a safety bar mounted to the vehicle and pivotable between vertical and angled positions; restraining means secured to the safety bar and operable to move between restraining and non-restraining positions; movable means movable along the safety bar and operable to move the restraining means between restraining and non-restraining positions; means for securing the restraining means to the safety bar while in its restraining position; and transmission means connected to the safety bar for moving the movable means.

BRIEF DESCRIPTION OF THE DRAWINGS

For a more complete understanding of the present invention, reference is made to the following drawings, in which:

FIGS. 8 through 10 are front views of the passenger restraint system showing the deployment cycle of the system;

FIGS. 11 through 13 are front views of the passenger restraint system showing the release cycle of the system;

FIG. 14 is a front view of an alternative embodiment of the passenger restraint system;

FIG. 15 is a side view of the alternative embodiment of the present invention during the deployment cycle, showing movement of the safety bar between vertical and angled positions; and FIG. 16 is a cross-sectional view of the safety bar, showing the direction of movement of the train/belt buckle assembly.

DETAILED DESCRIPTION OF THE INVENTION

Figure 1:
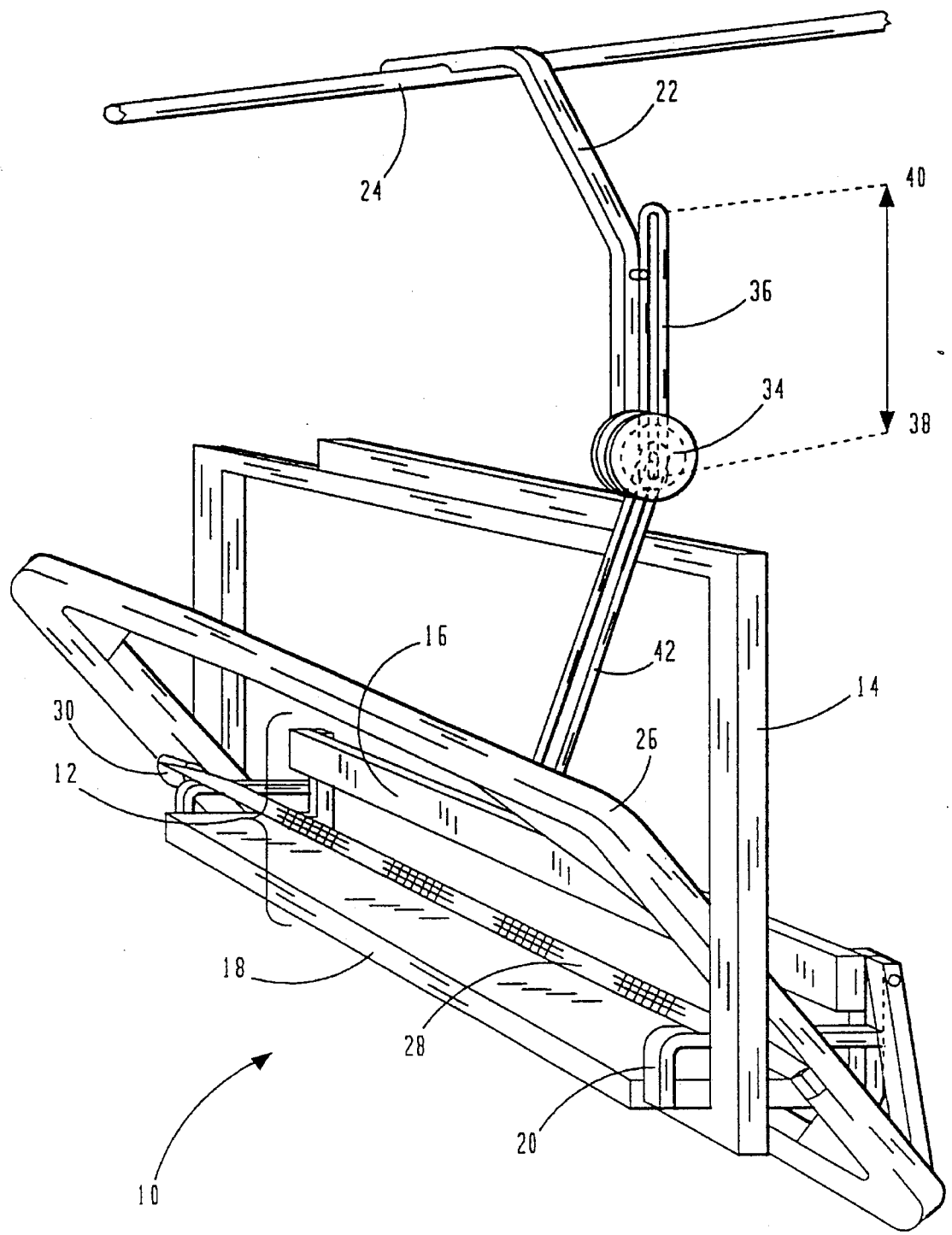
FIG. 1 is a perspective view of the passenger restraint system of the present invention showing the seatbelt in an engaged position.
Figure 2:
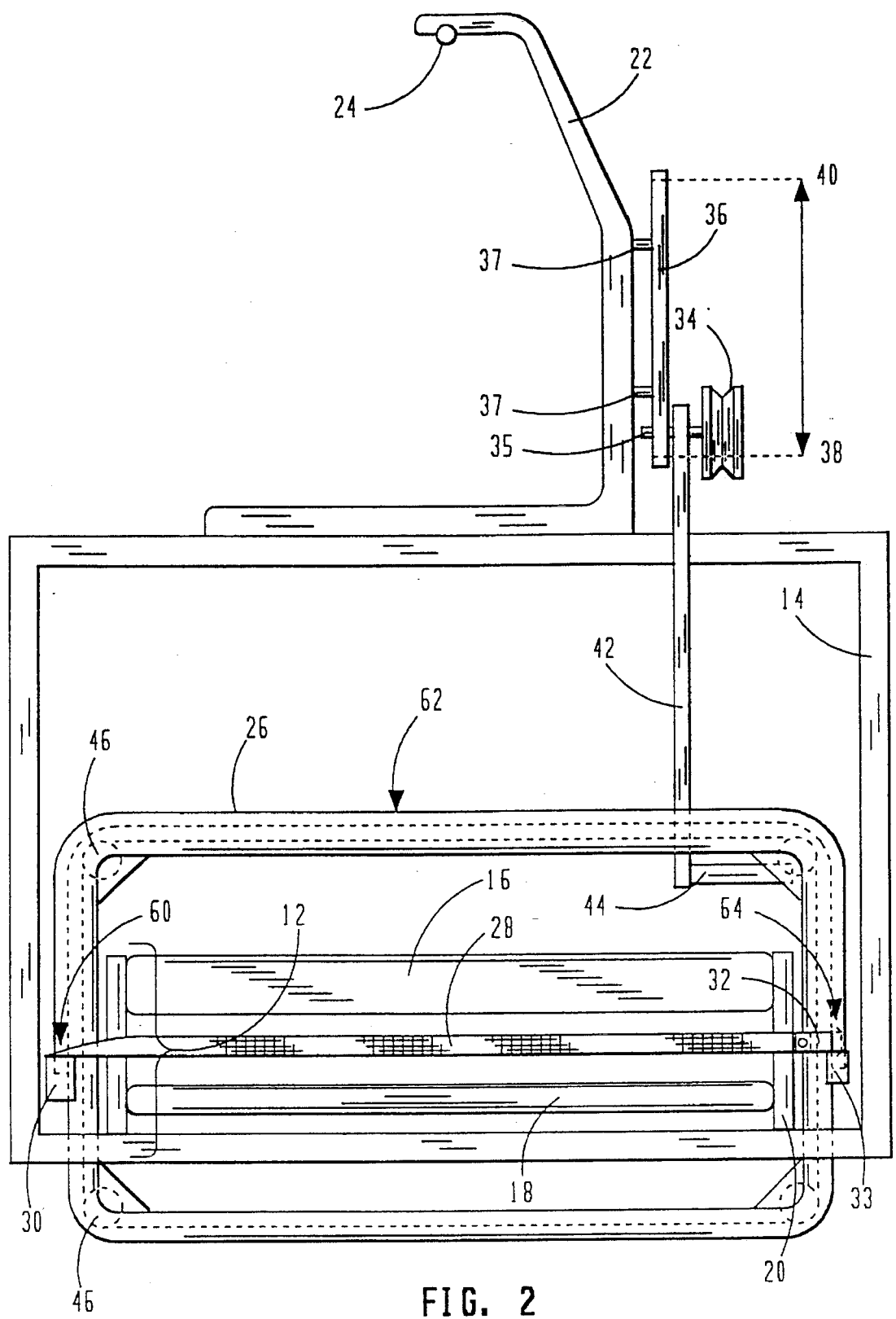
FIG. 2 is a front view of the passenger restraint system illustrated in FIG. 1.

Referring now to the Drawings wherein like reference characters designate like or similar parts throughout the sixteen views, and in particular to FIGS. 1 and 2, there are shown perspective and front views, respectively, of a passenger restraint system 10 according to the present invention.

Although the present invention will be described in the context of cable-supported, aerial chairlifts commonly found at ski resorts and amusement parks and in the context of vehicles, it will be appreciated that the invention has other applications where a passive passenger restraint system is desirable.

The passenger restraint system 10 employs a chair 12 mounted in a frame 14. The chair may be a standard chair or a bench-type chair as illustrated in FIG. 1. The chair 12 may be manufactured according to any conventional construction in the industry. Chair 12 includes a seatback 16 and a seat bottom 18. Arms 20 are positioned at each end of the chair 12.

A support member 22 is secured to the top of the frame 14. The upper end of the support member 22 is typically hook shaped. The upper end of the support member 22 clamps around a smooth sleeve (not shown) fixed on a cable 24.

During normal operation of the chairlift, the chair assembly carrying passengers (attached to the cable 24) exits the tower (not shown) at the bottom of the mountain and begins the ascent up the mountain. After the chair 12 reaches the top of the mountain, or other destination, the chair 12 enters the last tower, discharges the passengers and returns to the bottom to pick up additional passengers.

A safety bar 26 is pivotably mounted to the frame 14. Preferably, the safety bar 26 has a curvature substantially as shown in FIG. 1. The safety bar 26 is constructed of tubular or cylindrical members formed of steel or some other suitable material. In the preferred embodiment, the safety bar 26 is constructed of ⅝" steel pipe.

The safety bar 26 is adapted to be rotated from a substantially vertical position to a position approximately 45° from vertical. As illustrated in FIG. 2, when passengers sit down on the chair 12, the safety bar 26 is in a vertical position, in substantially the same plane as the seatback 16. After the passengers are seated and the chair 12 begins moving, the safety bar 26 pivots to the angled position shown in FIG. 1. The safety bar 26 remains in the angled position until the passengers prepare to exit the chair at the end of the trip.

A seatbelt 28 is positioned near the seat bottom 18. When not in use, the seatbelt 28 remains rolled up on a belt reel 30. The seatbelt 28 is unrolled out of the belt reel 30 at the time of deployment of the passenger restraint system. After release of the restraint system, the seatbelt 28 is rewound back into the belt reel 30.

A seatbelt buckle 32 is positioned at the distal end of the seatbelt 28. The seatbelt buckle 32 engages with a latch 33 mounted on the safety bar 26 at approximately lap level of the passengers.

A drive wheel 34 is positioned in a slotted support member 36. The drive wheel 34 is mounted to a shaft 35 which is inserted in the slot of the slotted support member 36. The slotted support member 36 is mounted to the hook-shaped support member 22 in a vertical position. Smaller support members 37 secure the slotted support member 36 to the hook-shaped support member 22.

The drive wheel slidably moves between two positions on the slotted support member 36: a downward position 38 and an upward position 40. A chain 42 is connected to the drive wheel 34 and the safety bar 26. The chain 42 is connected to a drive sprocket 44.

Inside the safety bar 26 there are multiple drive pulleys 46. In the preferred embodiment, four drive pulleys 46 are located at each of the four corners of the substantially rectangular safety bar 26. The drive pulleys 46 are connected to the drive sprocket 44.

Figure 3:
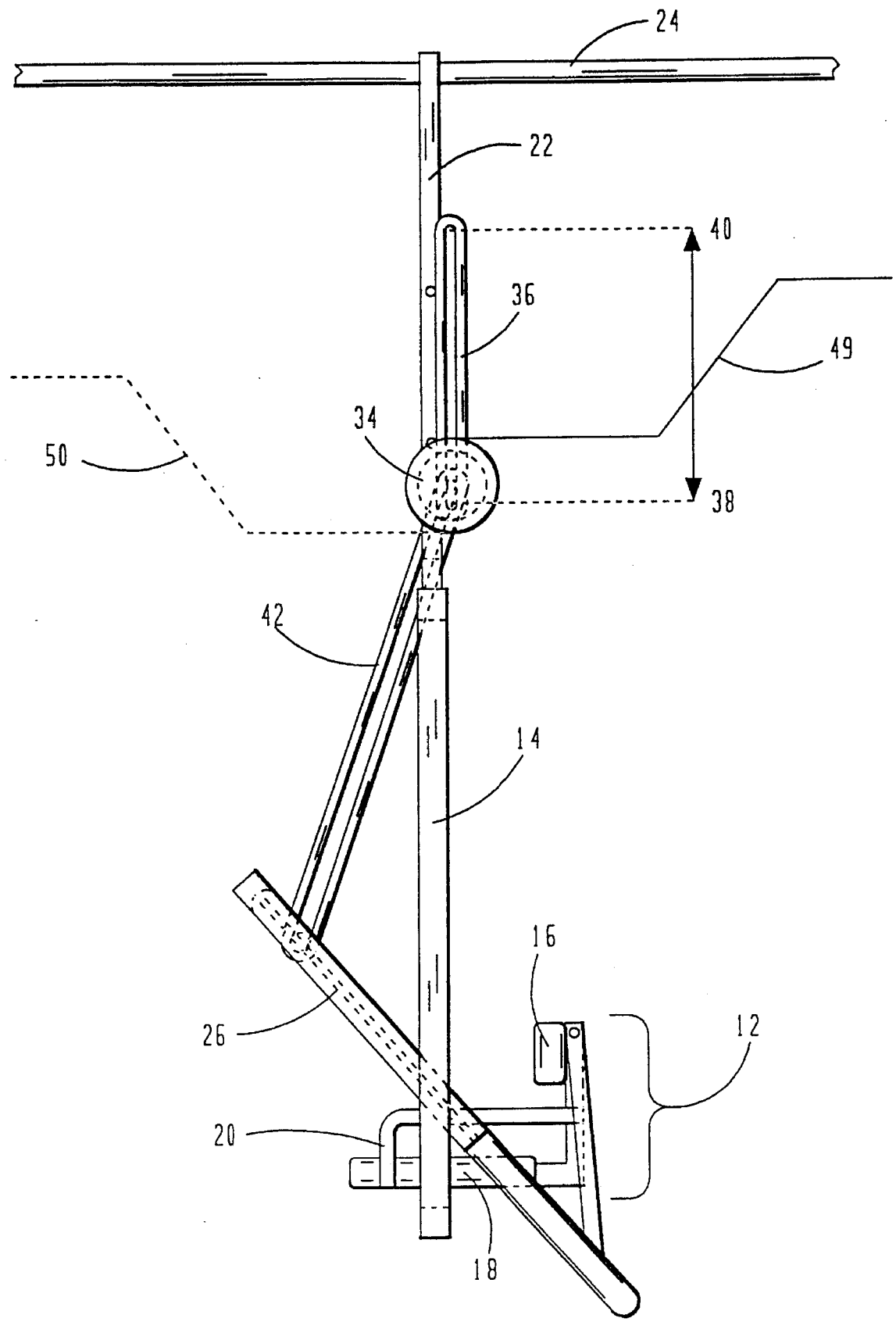
FIG. 3 is a side view of the passenger restraint system shown in FIG. 2, illustrating how movement of the chair assembly along the deployment and release ramps moves the restraint system.

During deployment, the passenger restraint system 10 is driven by the movement of the chair assembly. The drive wheel 34 begins in the upward position 40. When the chairlift exits the tower at the bottom of the mountain, the drive wheel 34 follows along the tracks of the deployment ramp (FIG. 3). The drive wheel 34 rolls down the deployment ramp, turning in a clockwise direction. The drive wheel 34 moves to the downward position 38. As the drive wheel 34 moves to the downward position 38, the safety bar 26 lowers to an angled position (FIG. 2) from a vertical position (FIG. 1). After the drive wheel 34 rolls forward off of the deployment ramp, the chair assembly moves away from the tower and continues its ascent up the mountain along the cable 24.

Movement of the drive wheel 34 drives in turn the chain 42, the drive sprocket 44 and the drive pulleys 46. A cable 48 is disposed inside the safety bar 26. In the preferred embodiment, ¼" cable is used. The drive pulleys 46 move the cable 48 through the interior of the hollow safety bar 26.

FIG. 3 is a side view of the passenger restraint system shown in FIG. 2. The chair 12 is mounted in a frame 14 which is suspended from the cable 24 via the hook-shaped support member 22. The chair 12 includes a seatback 16, seat bottom 18 and arms 20.

The safety bar 26 mounted on the frame 14 pivots between vertical and angled positions. The drive wheel 34 moves between downward position 38 and upward position 40. Movement of the drive wheel turns a chain 42. The chain 42 moves a drive sprocket (not shown) which turns drive pulleys 46 (not shown) inside the safety bar 26. Movement of the drive pulleys 46 advances a cable (not shown) through the interior of the safety bar 26. During deployment of the passenger restraint system, the drive wheel 34 moves along the deployment ramp 49.

During retraction of the passenger restraint system, the drive wheel moves along the retraction ramp 50. The drive wheel 34 begins the release cycle in the downward position 38, just as it was at the end of the deployment cycle. As the chair assembly approaches the final tower of the chairlift, the drive wheel 34 moves onto the retraction ramp 50. The drive wheel 34 rolls forward and ascends the retraction ramp 50. During its forward movement, the drive wheel 34 moves vertically up the slot in the slotted member 36 and stops in the upward position 40. The upward movement of the drive wheel 34 raises the safety bar 26 to a vertical position.

Figure 4:
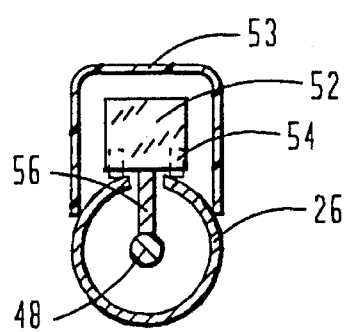
FIG. 4 is a cross-sectional view of the safety bar of the passenger restraint system, illustrating the relationship between the train and the safety bar.
Figure 5:
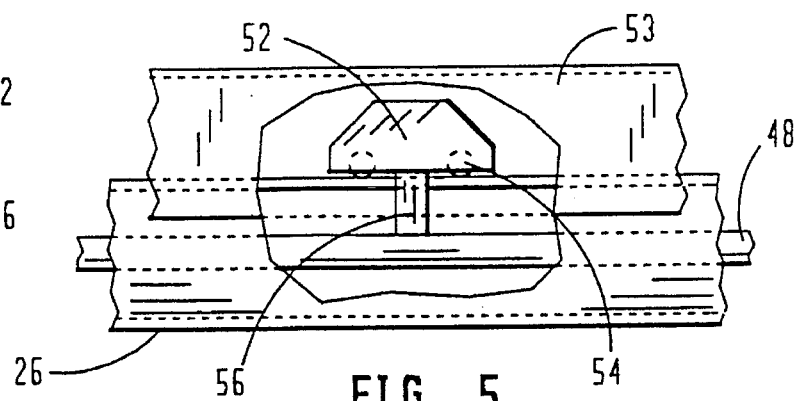
FIG. 5 is a side view of the safety bar with a cutaway showing the train component.
Figure 6:
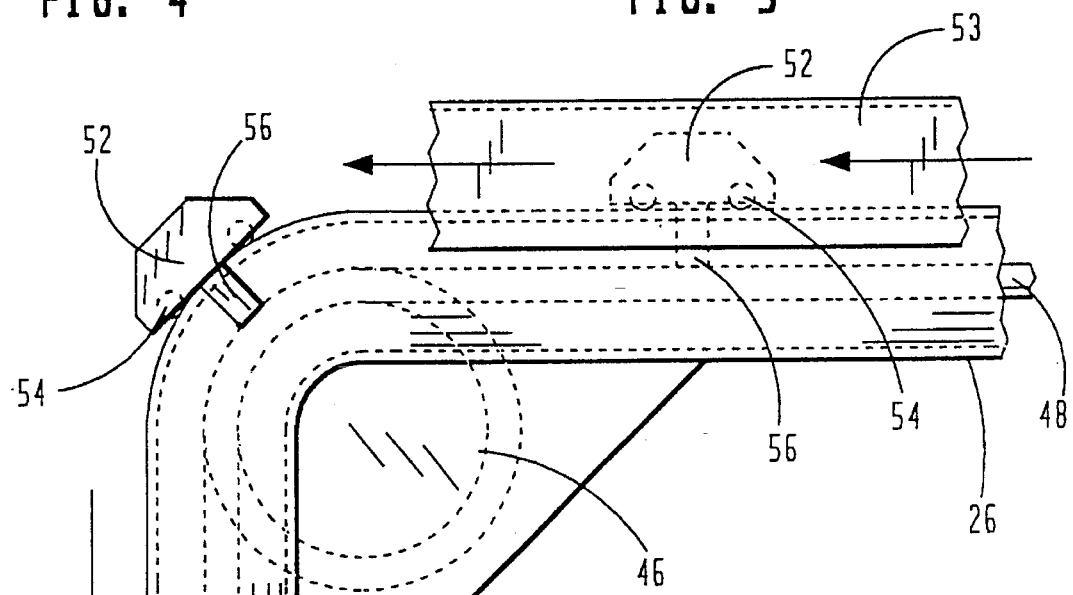
FIG. 6 is a corner view of the safety bar showing the train component in three positions.

Turning now to FIGS. 4, 5 and 6, there are shown cross-sectional and side views of the safety bar 26 illustrating the relationship between the train assembly and the safety bar 26. The cable 48 moves along the interior surface of the hollow safety bar 26.

The train 52 is located on the exterior of the safety bar 26. A cover 53 overlies the train 52. Preferably, the cover 53 is composed of plastic or rubber shielding. The train 52 moves along the exterior of the safety bar during the deployment and release cycles. The train 52 moves in opposite directions during each cycle. The cover 53 provides a smooth surface over the train 52 to prevent possible injury of passengers during the deployment and release cycles. A latch hook is positioned inside the train 52. During deployment, latch hook engages latch 33 mounted on safety bar 26.

Multiple rollers 54 are mounted to the train 52. The rollers 54 move the train 54 along the exterior surface of the safety bar 26. A vertical connector 56 is mounted to the bottom of the train 52. The vertical connector 56 is also attached to the cable 48 inside the safety bar 26. There is an opening along the length of the safety bar 26 through which the vertical connector 56 protrudes to connect to the train 52. The drive pulleys 46 inside the safety bar 26 move the vertical connector 56 inside the safety bar 26, while the train 52 connected to the vertical connector 56 moves over the exterior surface of the safety bar 26.

The train/belt buckle assembly 52/32 is equipped with a manual release so that rescuers may release the seatbelt 28 in the event of a lift evacuation.

FIGS. 6 graphically illustrates movement of the train 52 on the safety bar 26. The drive pulleys 46 advance the cable 48 through the interior of the safety bar 26 and the train 52 overlain by a protective cover 53 travels over the outer surface of the safety bar 26. Rollers 54 assist the train 52 in a smooth movement along the safety bar 26.

Figure 7:
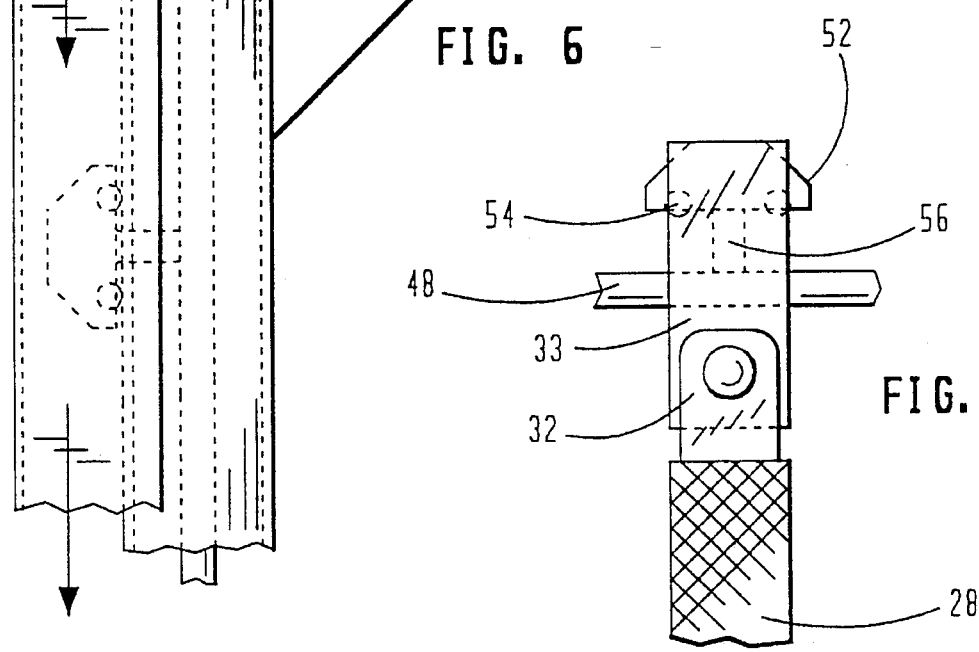
FIG. 7 is a view of the seatbelt attached to the train.

FIG. 7 shows the train/belt buckle assembly 52/32 at the end of the deployment cycle. The seatbelt buckle 32 with attached seatbelt slides into and detachably fastens to a latch 33 mounted to the safety bar 26.

During the deployment cycle, the train/belt buckle assembly 52/32 is positioned at one end of the chair 12 in a starting vertical position 60. The train/belt buckle assembly 52/32 will move along the exterior surface of the safety bar 26 through a horizontal position 62 on the safety bar 26 and finally to a second vertical position 64 on the safety bar 26 at the opposite end of the chair 12.

Movement of the train/belt buckle assembly 52/32 is controlled by the drive wheel 34. As the drive wheel 34 rolls down the descending deployment ramp 49, the drive wheel 34 moves into the downward position 38. The drive wheel's movement lowers the safety bar 26 into a position at a 45° to the seatback 16. The cable 48 inside the safety bar 26 pulls the coupled train/belt buckle assembly 52/32 from position 60, through position 62 to a stop at position 64. The seatbelt buckle 32 with attached seatbelt 28 engages the latch 33 mounted on the safety bar 26.

At this point, the seatbelt 28 is now deployed in a straight line from position 60 to position 64, across the laps of the passengers.

FIGS. 8 through 10 illustrate sequentially the deployment of the passenger restraint system of the present invention. The deployment cycle begins soon after the passengers have been seated in the chair. This will typically occur at the sheave bank at the bottom terminal of the ski lift, where the deployment ramp 49 is located.

Turning first to FIG. 8, the chair 12 mounted to the frame 14 is suspended from the hook-shaped support member 22 and the cable 24. The safety bar 26 is in a vertical position, in the same plane as the seatback 16. Support members 37 fasten the slotted support member 36 to the hook-shaped support member 22.

The train/belt buckle assembly 52/32 is located at the first vertical position 60, adjacent to the belt reel 30, with the belt buckle 32 coupled to the train 52. The seatbelt 28 (not shown) is coiled inside the belt reel 30. The drive wheel 34 is in the upward position 40 in the slotted support member 36. Drive pulleys 46 inside the safety bar 26 will move the train 52 along the exterior surface of the safety bar 26.

In FIG. 9, as the drive wheel 34 rolls forward on the deployment ramp 49 (not shown), the drive wheel 34 moves down the slotted support member 36. The drive wheel 34 turns in a clockwise direction and moves towards the downward position 38. This movement lowers the safety bar 26 to an angled position relative to the seatback 16.

The drive wheel 34 turns the chain 42, which turns the drive sprocket 44, which turns the drive pulleys 46. The drive pulleys 46 move the cable 48 through the inside of the safety bar 26. The cable 48 is connected to the train/belt buckle assembly 52/32 via the vertical connector 56 (not shown).

The train/belt buckle assembly 52/32 advances from the initial vertical position 60 through the horizontal position 62, carrying the seatbelt 28 across the laps of the passengers. Although the train/belt buckle assembly 52/32 does not stop at this position, FIG. 9 shows the train/belt buckle assembly 52/32 in the intermediate, horizontal position 62. Additional, coiled portions of the seatbelt 28 advance out of the belt reel 30 as the train/belt buckle assembly 52/32 moves along the safety bar 26.

Finally, as illustrated in FIG. 10, the drive wheel 34 reaches the downward position 38. The safety bar 26 has moved to a lowered, angled position. The train/belt buckle assembly 52/32 has stopped at the second vertical position 64, at the opposite end of the chair 12 from the first vertical position 60. The seatbelt buckle 32 has engaged the latch 33. The seatbelt 28 is now deployed in a straight line from position 60 to position 64 across the laps of the passengers. The entire passenger restraint system remains in the position illustrated in FIG. 9 until just before the unloading of the passengers at the end of the trip.

FIGS. 11 through 13 are successive front views showing the release or retraction cycle of the passenger restraint system. When the passengers have been transported to the final destination, the release cycle begins. The release cycle occurs where the retraction ramp is suspended from the last tower.

The release cycle begins in FIG. 11 with the train/belt buckle assembly 52/32 at the second vertical position 64, with the seatbelt 28 engaged and deployed. The seatbelt buckle 32 is secured via latch hook (not shown) to the latch 33 mounted on the safety bar 26. The safety bar 26 begins in the downward, angled position and the drive wheel 34 is in the downward position 38.

Movement begins as illustrated in FIG. 12. As the drive wheel 34 rolls over the retraction ramp 50 (not shown), the drive wheel 34 is turned in a counterclockwise direction. Turning the drive wheel 34 in the opposite direction from the deployment cycle causes both the belt buckle 32 and the latch hook to disengage from the latch 33. The seatbelt 28 is now free to retract across the laps of the passengers directly from the second vertical position 64 to the first vertical position 60. Meanwhile, the train 52 reverses from the second vertical position 64 through the intermediate position 62. FIG. 12 shows the train 52 in the intermediate position.

Turning to FIG. 13, the drive pulleys 46 advance the cable 48 inside the safety bar 26, simultaneously moving the train 52 from the horizontal position 62 to termination at the first vertical position 60. In the preferred embodiment, it takes approximately two to four seconds for the train 52 to return to the starting position 60. The seatbelt 28 has recoiled into the belt reel 30. The belt buckle 32 remains outside of the belt reel 30. At the first vertical position 60, the train 52 passes over the seatbelt 28 and re-engages the belt buckle 32. As the drive wheel 34 ascends to the end of the retraction ramp 50, the drive wheel 34 is lifted to the upward position 40, returning the safety bar 26 to its earlier vertical position. The passengers exit the chair 12. The passenger restraint system 10 is now ready for the next passengers and the next deployment cycle.

There are numerous advantages to the passenger restraint system 10 of the present invention. The passenger restraint system 10 may be used to restrain multiple passengers at one time. The passenger restraint system 10 restrains passengers as soon as the passengers are seated, thereby reducing or eliminating the potential for fall-type injuries. It may be used in a variety of open-air vehicles other than ski lifts.

The passenger restraint system 10 utilizes a lap seat belt, rather than relying exclusively on a safety bar for restraint. The restraint system 10 deploys and releases quickly, causing little or no inconvenience to the passengers and the chairlift operator. The restraint system 10 is automatic in both cycles, permitting the chairlift operator to attend to management of the chairlift. Finally, the passenger restraint system 10 includes additional safety features such as the manual release for emergencies.

FIGS. 14–16 illustrate an alternative embodiment of the present invention 100 for use in a vehicle. The alternative embodiment restraint system 100 utilizes many of the components of the preferred embodiment restraint system 10. These components will be described generally and/or as necessary to describe their modifications in the alternative embodiment. Unlike the preferred embodiment system 10, the alternative embodiment restraint system 100 restrains each passenger individually using two, rather than one, restraining belt.

The deployment and retraction cycles of the passenger restraint system 100 will be described for the driver's position, but it will be understood that the cycles are similar for other passenger positions.

FIGS. 14 and 15 show a front view and a side view, respectively, of the alternative embodiment passenger restraint system 100. FIG. 14 illustrates the restraint system 100 prior to deployment, while FIG. 15 illustrates the restraint system 100 during deployment.

The vehicle (not shown) includes a driver's from seat 112 having a seatback 116 and a passenger's front seat with seatback (not shown). A safety bar 126 is adapted to be rotated from a substantially vertical position to a position approximately 45° from vertical (FIG. 15).

When the driver sits down in the driver's seat 112, the safety bar 126 is in a vertical position, in substantially the same plane as the seatback 116. After the driver is seated, the safety bar 126 pivots to the angled position shown in FIG. 15. The safety bar 126 remains in the angled position until the deployment cycle is completed. Pivot support 170 for the safety bar 126 is located in the seatback 116.

Deployment of the restraint system 100 occurs from the center of the vehicle, with movement towards the vehicle doors. A drive motor 172 is located on the seatback 116 near the driver's right shoulder. The drive motor 172 facilitates movement of the safety bar 126 from the vertical position to the angled position.

A sensor (not shown) responds to the driver being seated in the vehicle and/or inserting the key into the ignition. The sensor activates the driver drive motor 172.

A shoulder belt 128 is positioned on the seatback 116 near the drive motor 172. When not in use, the shoulder belt 128 remains rolled up on a first belt reel 130. Alternatively, the shoulder belt 128 and first belt reel 130 may be located on the interior of the car. The shoulder belt 128 is unrolled out of the first belt reel 130 at the time of deployment of the passenger restraint system 100. After release of the restraint system 100, the shoulder belt 128 is rewound back into the first belt reel 130.

A belt buckle 132 is positioned at the distal end of the shoulder belt 128. The belt buckle 132 engages a latch 133 mounted on the seat 112 at approximately left hip level of the driver.

The passenger restraint system 100 also includes a waist belt 174. The waist belt 174 advances out of a second belt reel 176. The second belt reel 176 is fixed to the seat 112 or to the interior of the vehicle at approximately right hip level of the driver. The waist belt 174 is unrolled out of the second belt reel 176 as needed at the time of deployment of the passenger restraint system 100. After release of the restraint system 100, the waist belt 174 is rewound back into the second belt reel 176.

As illustrated in FIG. 14, the waist belt 174 is secured to the shoulder belt 128. The shoulder belt 128 and the waist belt 174 share a single belt buckle 132.

A train 152 is connected to the shoulder belt 128 and the waist belt 174 via the belt buckle 132. During the deployment and retraction cycles, the shoulder belt 128 and waist belt 174 remain attached to the train/belt buckle assembly 152/132. The train 152 is constructed as in the preferred embodiment restraint system 10, with components such as the vertical connector, rollers, cover and latch hook (see FIGS. 4, 5 and 6).

The drive motor 172 controls movement of the train/belt buckle assembly 152/132. During the deployment and retraction cycles, the train/belt buckle assembly 152/132 moves along the exterior surface of the safety bar 126. The train/belt buckle assembly 152/132 moves from the shoulder reel 130 towards the latch 133 during the deployment cycle and from the latch 133 towards the shoulder reel 130 during the retraction cycle.

As the train/belt buckle assembly 152/132 advances from the original vertical position near the driver's right shoulder, the shoulder belt 128 is moved across the driver's chest, and the waist belt 174 is moved across the driver's lap, towards the latch 133 near the driver's left hip. Additional, coiled portions of the shoulder belt 128 and the waist belt 174 advance out of the first belt reel 130 and the second belt reel 176 as the train/belt buckle assembly 152/132 moves along the exterior of the safety bar 126.

The belt buckle 132 with attached shoulder belt 128 and waist belt 174 engages the latch 133 located near the driver's left hip. After the train/belt buckle assembly 152/132 engages the latch 133, the drive motor 172 returns the safety bar 126 to its original vertical position.

FIG. 16 graphically shows the direction of movement of the train/belt buckle assembly 152/132 along the exterior surface of the safety bar 126 during the deployment and retraction cycles. Multiple pulleys are located inside the safety bar 126. A drive pulley 180 is located inside the safety bar 126 near the (exterior) position of the drive motor 172. A return pulley 182 is located inside the safety bar 126 near the (exterior) position of the latch 133. Double pulleys 184 are positioned inside the safety bar 126 between the drive pulley 180 and the return pulley 182. One pulley 184 turns in a clockwise direction; the other pulley 184 turns in a counterclockwise direction.

The drive motor 172 turns the drive pulley 180. Movement of the drive pulley 180 advances the cable 148 through the interior of the safety bar 126.

There is an opening along the length of the safety bar 126 through which the vertical connector (not shown) protrudes to connect to the train 152. The drive pulley 180 inside the safety bar 126 moves the vertical connector inside the safety bar 126, while the train 152 connected to the vertical connector moves over the exterior surface of the safety bar 126.

Because the shoulder belt 128 and the waist belt 174 are secured to the train/belt buckle assembly 152/132, the retraction cycle is essentially a reverse of the deployment cycle. The retraction cycle begins with the train/belt buckle assembly 152/132 at the driver's left hip position, with the shoulder belt 128 and the waist belt 174 engaged and deployed. The retraction cycle begins as soon as the vehicle engine is turned off. The train/belt buckle assembly 152/132 is secured to the latch 133 mounted on or near the seat 112. The safety bar 126 begins in the upward, vertical position.

The drive motor 172 causes the safety bar 126 to lower from its upward, vertical position to its angled position. The drive motor activates the return pulley 182.

Pulleys advance the cable 148 inside the safety bar, simultaneously moving the train/belt buckle assembly 152/132 with attached shoulder belt 128 and waist belt 174 in the opposite direction along the exterior of the safety bar 126, i.e., from the deployed (hip) position to termination at the original vertical position.

The shoulder belt 128 has recoiled into the first belt reel 130. The belt buckle 132 remains outside of the first belt reel 130. The waist belt 174 has recoiled into the second belt reel 176, but remains secured to the shoulder belt 128. The belt buckle 132 remains outside of the first belt reel 130. The passengers exit the vehicle. The passenger restraint system 100 is now ready for the next passengers and the next deployment cycle.

Although preferred and alternative embodiments of the present invention have been illustrated in the accompanying Drawings and described in the foregoing Detailed Description of the Invention, it will be appreciated by those skilled in the art that the invention is not limited to the embodiments disclosed, but is capable of numerous rearrangements, modifications and substitutions without departing from the true spirit of the invention.

I claim:

1. A passenger restraint system for restraining passengers in an elevated, open-air vehicle, comprising:

a safety bar mounted to the vehicle and pivotable between vertical and angled positions;

restraining means fixed to the safety bar and operable to move between restraining and non-restraining positions;

movable means movable along the safety bar and operable to move the restraining means between restraining and non-restraining positions;

means for securing the restraining means to the safety bar while in its restraining position; and transmission means connected to the safety bar for moving the movable means.

2. The passenger restraint system of claim 1 wherein the system is non-motorized.

3. The passenger restraint system of claim 1 wherein the safety bar encloses a cable.

4. The passenger restraint system of claim 1 wherein the restraining means extends from a position fixed on the safety bar and is adapted to contact said movable means and then extend across the laps of the passengers.

5. The passenger restraint system of claim 1 wherein the restraining means is a seatbelt.

6. The passenger restraint system of claim 1 wherein the movable means is detachably coupled to the restraining means.

7. The passenger restraint system of claim 1 wherein the movable means is overlain by a cover.

8. The passenger restraint system of claim 3 wherein said movable means includes a bar attached to said cable for contact with and movement of the movable means.

9. The passenger restraint system of claim 1 wherein the movable means comprises a train.

10. The passenger restraint system of claim 1 wherein the means for securing the restraining means to the safety bar while in its restraining position comprises a latch.

11. The passenger restraint system of claim 1 further including emergency release means for releasing said restraining means from its restraining position.

12. The passenger restraint system of claim 3 wherein the transmission means advances the cable inside the safety bar to move the movable means.

13. The passenger restraint system of claim 1 wherein said transmission means comprises a sprocket chain transmission.

14. The passenger restraint system of claim 1 wherein the transmission means includes a drive wheel.

15. The passenger restraint system of claim 14 wherein a chain attaches the drive wheel to the safety bar.

16. A passenger restraint system for restraining passengers in an elevated, open-air vehicle, comprising:

a hollow, safety bar mounted to the vehicle and pivotable between vertical and angled positions;

a cable enclosed within the safety bar;

first anchor means mounted at a fixed position on the vehicle;

second anchor means mounted at a fixed position on the vehicle;

a seatbelt for movement between restraining and non-restraining positions, said seatbelt having one end attached to said first anchor means and the other end attachable to said second anchor means;

a train movable along the safety bar and operable to move the seatbelt between restraining and non-restraining positions;

a bar fixed to the cable and train for contact with and movement of the train;

a sprocket chain transmission connected to the safety bar for moving the cable; and a drive wheel connected to the sprocket chain transmission and operable to pivot the safety bar between vertical and angled positions.

17. The passenger restraint system of claim 16 wherein the first anchor means comprises a belt reel.

18. The passenger restraint system of claim 16 wherein the second anchor means comprises a latch.

19. The passenger restraint system of claim 16 further including emergency release means for releasing the seatbelt from its restraining position.

20. The passenger restraint system of claim 16 wherein the train moves along the exterior surface of the safety bar.

21. An elevated, open-air vehicle having a passenger restraint system for restraining passengers, comprising:

a frame;

a chair mounted to the frame;

a support member mounted to the frame;

a cable connected to the support member for elevated movement of the chair;

a hollow, safety bar mounted to the chair and pivotable between vertical and angled positions;

a cable enclosed within the safety bar;

a belt reel mounted at a fixed position on the safety bar;

a latch mounted at a fixed position on the safety bar;

a seatbelt for movement between restraining and non-restraining positions, said seatbelt having one end attached to the belt reel and the other end attachable to the latch;

a train movable along the safety bar and operable to move the seatbelt between restraining and non-restraining positions;

a bar fixed to the cable inside the safety bar and the train for contact with and movement of the train;

a drive wheel connected to the support member and operable to pivot the safety bar between vertical and angled positions;

a drive sprocket secured to the safety bar;

a chain connected to the drive sprocket and movable between the drive sprocket and the drive wheel; and drive pulleys connected to the chain inside the safety bar for moving said chain.

* * * * *